UNITED STATES PATENT OFFICE.

J. BURROWS HYDE, OF NEW YORK, N. Y.

IMPROVED COMPOUND FOR DESTROYING VERMIN.

Specification forming part of Letters Patent No. 50,006, dated September 19, 1865.

*To all whom it may concern:*

Be it known, that I, J. BURROWS HYDE, of the city, county, and State of New York, have invented a new and useful Compound for Destroying Vermin upon Animals, and for other useful purposes; and I do hereby declare that the following is a full and exact description thereof:

My improvement consist in combining petroleum with the decoction of tobacco. The tobacco should be cut into shreds and steeped, boiling in a covered vessel. When fully digested, drain off the fluid from the leaves and concentrate the liquor until it will combine with the oil, which is to be added in such quantity as will combine and not float on the top. Then add water until the color of the fluid is about that of green tea as usually prepared for the table.

The animal may be dipped, or the preparation may be applied with a sponge; and it may be sprinkled upon plants with a syringe. The extract of tobacco has been long used for the purpose specified, but the eggs and larvæ often escape its effects. The addition of petroleum insures extermination to all the insects, is quicker in its effects, and destroys all incipient vermin as well; besides there will be a slight petroleum odor left on the animal for several days, which dispels insects from the vicinity to which the animal resorts. It is equally efficient with fowls or birds, by washing with a sponge under the wings or around their necks.

For commercial purposes the tobacco-extract should be concentrated to the consistency of thick tar, in which condition, being of a saponaceous nature, it will readily combine with the petroleum, and the mixture be soluble in water.

The proportion may be varied; but I prefer to use one part, by measure, of petroleum to two parts of the concentrated extract; and in using the mixture I first incorporate one part, by measure, with six parts hot water added gradually, and stirred well at same time. Then to this mixture add ten or twelve times its measure of cold water, stirring well, and apply as before directed.

I claim—

A mixture of extract of tobacco and petroleum, for the purpose set forth.

J. BURROWS HYDE.

Witnesses:
    SAMUEL C. JOLLY,
    JOHN M. SCRIBNER, Jr.